United States Patent
Lopez

(10) Patent No.: US 9,712,649 B2
(45) Date of Patent: Jul. 18, 2017

(54) CCN FRAGMENTATION GATEWAY

(71) Applicant: Telefonaktiebolaget L M Ericsson (publ), Stockholm (SE)

(72) Inventor: Carlos Valencia Lopez, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 291 days.

(21) Appl. No.: 14/585,022

(22) Filed: Dec. 29, 2014

(65) Prior Publication Data

US 2016/0191385 A1   Jun. 30, 2016

(51) Int. Cl.
*H04L 29/06* (2006.01)
*H04L 29/08* (2006.01)
*H04N 21/231* (2011.01)

(52) U.S. Cl.
CPC ........ *H04L 69/166* (2013.01); *H04L 67/2842* (2013.01); *H04L 67/327* (2013.01); *H04L 65/60* (2013.01); *H04N 21/231* (2013.01)

(58) Field of Classification Search
CPC ..... H04L 45/306; H04L 45/745; H04L 47/36; H04L 67/2842; H04L 67/327; H04L 69/166; H04L 65/60; H04L 9/3247; H04N 21/222; H04N 21/23106; H04N 21/26603
See application file for complete search history.

(56) References Cited

U.S. PATENT DOCUMENTS

| | | | | |
|---|---|---|---|---|
| 5,959,974 A | * | 9/1999 | Badt | H04L 29/06 370/233 |
| 7,739,496 B2 | * | 6/2010 | Jacobs | H04L 63/0245 380/210 |
| 9,282,038 B2 | * | 3/2016 | Bansod | H04L 69/166 |
| 9,467,492 B2 | * | 10/2016 | Mosko | H04L 9/3247 |

(Continued)

OTHER PUBLICATIONS

Ghai et al, Secure Fragmentation for Content-Centric Networks (Extended Version), Aug. 19, 2015, 13 pages.*

(Continued)

*Primary Examiner* — Mounir Moutaouakil
(74) *Attorney, Agent, or Firm* — NDWE LLP

(57) ABSTRACT

A method is provided for managing fragmentation of packets for content object retrieval at a content centric networking (CCN) gateway in a CCN network. The method includes receiving a first CCN interest packet including a name for a first content object from a user equipment in an access network, storing a fragmentation stream identifier in a header of the first CCN interest packet, and setting a path minimum maximum transmission unit (MTU) in the first CCN interest packet to an MTU value required by a link between the CCN gateway and a node forwarding the first CCN interest packet to the CCN gateway. The method further includes forwarding the first CCN interest packet with updated fragmentation stream identifier and path minimum MTU toward a content provider, receiving a set of packets of including fragments of the first content object from the content provider, reassembling and verifying the (Continued)

first content object from the set of packets, and refragmenting the first content object to minimum MTU of the access network and storing the refragmented first content object in the content store. The first content object is then returned to the user equipment in the access network.

16 Claims, 9 Drawing Sheets

(56) References Cited

U.S. PATENT DOCUMENTS

| | | | | |
|---|---|---|---|---|
| 9,516,144 B2* | 12/2016 | Mosko | .................... | H04L 69/22 |
| 9,621,354 B2* | 4/2017 | Mosko | .................. | H04L 9/3247 |
| 2002/0141448 A1* | 10/2002 | Matsunaga | ............. | H04L 29/06 370/469 |
| 2004/0071140 A1 | 4/2004 | Jason et al. | | |
| 2005/0074001 A1 | 4/2005 | Mattes et al. | | |
| 2006/0020684 A1 | 1/2006 | Mukherjee et al. | | |
| 2016/0020907 A1* | 1/2016 | Mosko | .................. | H04L 9/3247 713/176 |
| 2016/0057189 A1* | 2/2016 | Mosko | .................... | H04L 65/60 709/219 |
| 2016/0105394 A1* | 4/2016 | Rangarajan | ........... | H04L 61/302 709/223 |

OTHER PUBLICATIONS

Mosko, "CCNx End-to-End Fragmentation, ccnx-mosko-fragmentation-01," Palo Alto Research Center, Internet Engineering Task Force, Internet-Draft, Jul. 17, 2014, 17 pages.
Palo Alto Research Center, Inc., "CCNx 1.0 Forwarding Introduction," Apr. 2014, 26 pages.
Palo Alto Research Center, Inc., "CCNx 1.0 Wire Format," Mar. 2014, 12 pages.
Ali, et al., "Node-ID Based Resource Reservation Protocol (RSVP) Hello: A Clarification Statement", Network Working Group, Network Working Group, Request for Comments: 4558, The Internet Society, (Jun. 2006), 7 pages.
Andersson, L. , et al., "LDP Specification", Network Working Group, Request for Comments: 5036, The EITF Trust, (Oct. 2007), 135 pages.
Awduche, D. , et al., "RSVP-TE: Extensions to RSVP for LSP Tunnels", Network Working Group, Request for Comments: 3209, The Internet Society, http://tools.ietf.org/html/rfc3209, (Dec. 2001), 61 pages.
Babiarz, J. , et al., "Configuration Guidelines for DiffServ Service Classes", Network Working Group, Request for Comments: 4594, The Internet Society, (Aug. 2006), 57 pages.
Baker, F. , et al., "A Differentiated Services Code Point (DSCP) for Capacity-Admitted Traffic", Internet Engineering Task Force (IETF), Request for Comments: 5865, (May 2010), 14 Pages.
Baker, F. , et al., "Management Information Base for the Differentiated Services Architecture", Network Working Group, Request for Comments: 3289, The Internet Society, (May 2002), 116 pages.
Berger, L. , "Generalized Multi-Protocol Label Switching (GMPLS) Signaling Resource ReserVation Protocol-Traffic Engineering (RSVP-TE) Extensions", Network Working Group, Request for Comments: 3473, The Internet Society, http://tools.ietf.org/html/rfc3473, (Jan. 2003), 42 pages.
Bernet, Y. , et al., "An Informal Management Model for Diffserv Routers", Network Working Group, Request for Comments: 3290, The Internet Society, (May 2002), 56 pages.
Black, D. , "Differentiated Services and Tunnels", Network Working Group, Request for Comments: 2983, The Internet Society, (Oct. 2000), 14 pages.
Black, D. , et al., "Per Hop Behavior Identification Codes", Network Working Group, Request for Comments: 3140, The Internet Society, (Jun. 2001), 8 pages.
Blake, S. , et al., "An Architecture for Differentiated Services", Network Working Group, Request for Comments 2475, The Internet Society, (Dec. 1998), 36 pages.
Borman, D. , et al., "IPv6 Jumbograms", Network Working Group, Request for Comments: 2675, The Internet Society, (Aug. 1999), 9 pages.
Braden, et al., "Resource ReSerVation Protocol (RSVP)—Version 1 Functional Specification", Network Working Group, Request for Comments: 2205, (Sep. 1997), 112 pages.
Chan, K. , et al., "Differentiated Services Quality of Service Policy Information Base", Network Working Group, Request for Comments: 3317, The Internet Society, (Mar. 2003), 96 pages.
Charny, A. , et al., "Supplemental Information for the New Definition of the EF PHB (Expedited Forwarding Per-Hop Behavior)", Network Working Group, Request for Comments: 3247, The Internet Society, (Mar. 2002), 24 pages.
Coltun, R. , et al., "OSPF for IPv6", Network Working Group, Request for Comments: 5340, The IETF Trust, (Jul. 2008), 94 pages.
Davie, B. , et al., "An Expedited Forwarding Phb (Per-Hop Behavior)", Network Working Group, Request for Comments: 3246, The Internet Society, (Mar. 2002), 16 pages.
Deering, et al., "Internet Protocol, Version 6 (IPv6) Specification", Network Working Group, Request for Comments: 2460, The Internet Society, (Dec. 1998), 39 pages.
Eggert, L. , et al., "Unicast UDP Usage Guidelines for Application Designers", Network Working Group, Request for Comments: 5405, IETF Trust, (Nov. 2008), 27 pages.
Fenner, B. , et al., "Management Information Base for the User Datagram Protocol (UDP)", Network Working Group, Request for Comments: 4113, The Internet Society, (Jun. 2005), 19 pages.
Grossman, D. , "New Terminology and Clarifications for Diffserv", Network Working Group, Request for Comments: 3260, The Internet Society, (Apr. 2002), 10 pages.
Hedrick, C. , "Routing Information Protocol", Network Working Group, Request for Comments: 1058, (Jun. 1988), 33 pages.
Heinanen, J. , et al., "Assured Forwarding PHB Group", Network Working Group, Request for Comments: 2597, The Internet Society., (Jun. 1999), 11 pages.
Housley, R. , "Using Advanced Encryption Standard (AES) CCM Mode with IPsec Encapsulating Security Payload (ESP)", Network Working Group, Request for Comments: 4309, The Internet Society, (Dec. 2005), 13 pages.
Information Sciences Institute, University of Southern C., "Transmission control protocol darpa internet program protocol specification", Request for Comments: 793, (Sep. 1981), 91 pages.
Kent, et al., "Security Architecture for the Internet Protocol", Network Working Group, Request for Comments: 4301, The Internet Society, (Dec. 2005), 101 pages.
Kompella, et al., "Procedures for Modifying the Resource reSerVation Protocol (RSVP)", Network Working Group, Request for Comments: 3936, The Internet Society, (Oct. 2004), 7 pages.
Malkin, G. , "RIP Version 2", Network Working Group, Request for Comments: 2453, The Internet Society, (Nov. 1998), 39 pages.
Malkin, et al., "RIPng for IPv6", Network Working Group, Request for Comments: 2080, (Jan. 1997), 19 pages.
Moy, J. , "OSPF Version 2", Network Working Group, Request for Comments: 2328, The Internet Society, (Apr. 1998), 244 pages.
Nichols, K. , et al., "Definition of Differentiated Services Per Domain Behaviors and Rules for their Specification", Network Working Group, Request for Comments: 3086, The Internet Society, (Apr. 2001), 24 pages.
Nichols, K. , et al., "Definition of the Differentiated Services Field (DS Field) in the IPv4 and IPv6 Headers", Network Working Group, Request for Comments: 2474, The Internet Society, (Dec. 1998), 20 pages.
Oran, David , "OSI ISIS Intradomain Routing Protocol", Network Working Group, Request for Comments: 1142, (Feb. 1990), 157 pages.
Polk, et al., "A Resource Reservation Protocol (RSVP) Extension for the Reduction of Bandwidth of a Reservation Flow", Network Working Group, Request for Comments: 4495, The Internet Society, (May 2006), 21 pages.

(56) References Cited

OTHER PUBLICATIONS

Postel, J. , "User Datagram Protocol", RFC 768, (Aug. 28, 1980), 3 pages.
Rekhter, Y. , et al., "A Border Gateway Protocol 4 (BGP-4)", Network Working Group, Request for Comments: 4271, The Internet Society, (Jan. 2006), 104 pages.
Rosen, et al., "BGP/MPLS IP Virtual Private Networks (VPNs)", Network Working Group, Request for Comments: 4364, The Internet Society, (Feb. 2006), 47 pages.
Shenker, et al., "Specification of Guaranteed Quality of Service", Network Working Group, Request for Comments: 2212, (Sep. 1997), 20 pages.
Socolofsky, T. , et al., "A TCP/IP Tutorial", Network Working Group, Request for Comments: 1180, (Jan. 1991), 28 pages.
Wroclawski, J. , "Specification of the Controlled-Load Network Element Service", Network Working Group, Request for Comments: 2211, (Sep. 1997), 19 pages.
Wroclawski, J. , "The Use of RSVP with IETF Integrated Services", Network Working Group, Request for Comments: 2210, (Sep. 1997), 33 pages.
"CCNx (Pre 1.0) Access Control Specifications", *PARC*. Jun. 30, 2010; 24 pages.
"CCNx 1.0 Protocol Specification Roadmap", *PARC*: Apr. 14, 2014; 4 pages.

* cited by examiner

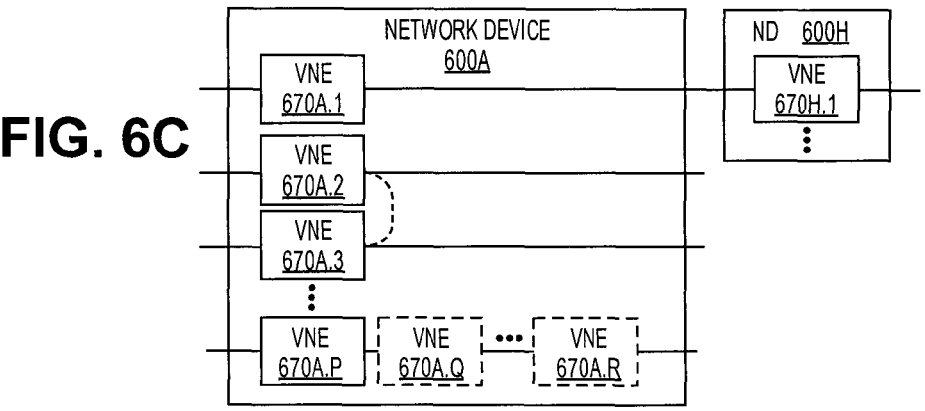
FIG. 6C
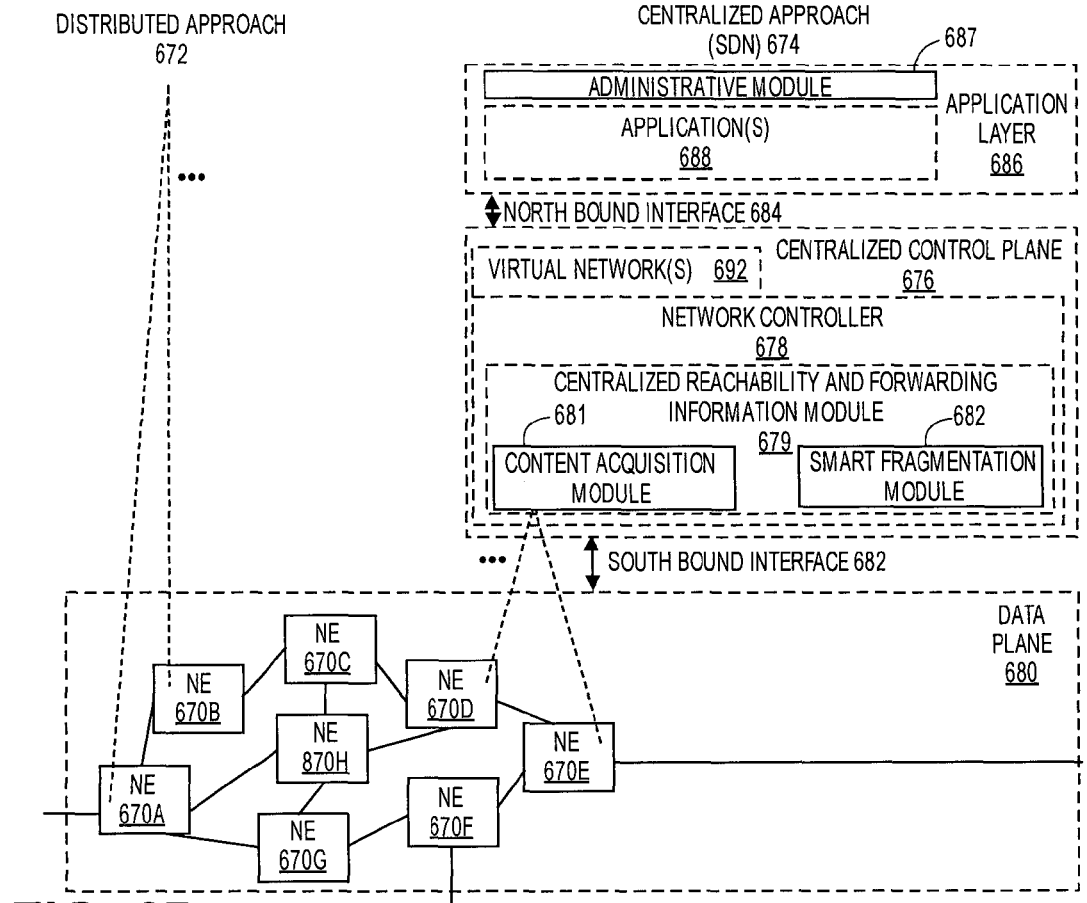
FIG. 6D
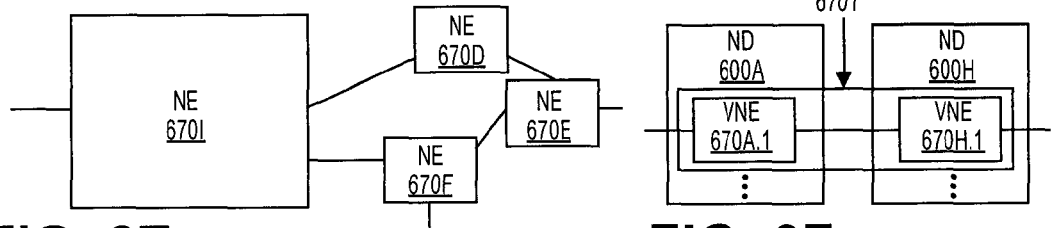
FIG. 6E
FIG. 6F

CCN FRAGMENTATION GATEWAY

FIELD

Embodiments of the invention relate to handling the fragmentation of a content object across a set of packets when retrieving content in information centric networking (ICN) networks. Specifically, the embodiments relate to a method and system implemented by a content centric networking (CCN) gateway to service CCN interest packets and fragmentation such that locally cached copies of the content object can be utilized regardless of the level of fragmentation supported by the ICN network and the access network.

BACKGROUND

An ICN network is a conceptualization of a networking protocol stack, in particular layers 3 and above of a network protocol stack. The CCN network as well similar networks like named data networking (NDN) networks are particular architectures and implementation of an ICN network. ICN networks, CCN and NDN networks are based on the premise of naming resources in these networks. In particular, the naming relates to the use of a globally shared namespace for objects that allows entities in these networks to retrieve any content of interest. NDN networks and CCN networks have similar architectures, thus for sake of clarity examples related to CCN networks are discussed herein below.

Thus, within a CCN network a name is utilized to identify a content object instead of an Internet Protocol (IP) address of the host of the content. In an IP network, routing is based on host names (e.g., source and destination addresses). In a CCN network by contrast, routing is based on a uniform resource identifier (URI) or similar identifier for a content object. CCN routing is performed hop-by-hop, using a longest prefix matching on the CCN name. All communications seeking to access data are framed as a request and response transaction. A CCN client sends a message referred to as a CCN interest to the nodes in the CCN. The nodes of the CCN network respond with a content object identified by a CCN name in the CCN interest. These CCN content objects are returned via a CCN response.

All content object packets are cryptographically signed by their initial provider. A CCN client can thus verify the integrity and authenticity of the content even if the packet comes from untrusted links or untrusted hosts. As a direct effect, CCN nodes in the CCN network are allowed to cache packets locally in a table called the content store. When a CCN network node receives a CCN interest packet, it can check whether its local content store has the requested content object and can send it back if found. The look up in the content store is by the CCN name. If the CCN name is not found in the local content store, then the CCN interest is forwarded according to entries for the CCN name in a forwarding information base (FIB) of the CCN network node.

SUMMARY

A method is provided for managing fragmentation of packets for content object retrieval at a content centric networking (CCN) gateway in a CCN network. The method includes receiving a first CCN interest packet including a name for a first content object from a user equipment in an access network, storing a fragmentation stream identifier in a header of the first CCN interest packet, and setting a path minimum maximum transmission unit (MTU) in the first CCN interest packet to an MTU value required by a link between the CCN gateway and a node forwarding the first CCN interest packet to the CCN gateway. The method further includes forwarding the first CCN interest packet with updated fragmentation stream identifier and path minimum MTU toward a content provider, receiving a set of packets of including fragments of the first content object from the content provider, reassembling and verifying the first content object from the set of packets, and refragmenting the first content object to minimum MTU of the access network and storing the refragmented first content object in the content store. The first content object is then returned to the user equipment in the access network.

A network device implements the CCN gateway to execute the method for managing fragmentation of packets for content object retrieval. The network device includes a non-transitory machine readable medium having stored therein a content acquisition module, and a network processor coupled to the non-transitory machine readable medium. The network processor is configured to execute the content acquisition module. The content acquisition module is configured to receive a first CCN interest packet including a name for a first content object from a user equipment in an access network, to store a fragmentation stream identifier in a header of the first CCN interest packet, and to set a path MTU in the first CCN interest packet to an MTU value required by a link between the CCN gateway and a node forwarding the first CCN interest packet to the CCN gateway. The content acquisition module is further configured to forward the first CCN interest packet with updated fragmentation stream identifier and path minimum MTU toward a content provider, to receive a set of packets of including fragments of the first content object from the content provider, to reassemble and verify the first content object from the set of packets, to refragment the first content object to minimum MTU of the access network and store the refragmented first content object in the content store, and to return the first content object to the user equipment in the access network.

A computing device implementing a plurality of virtual machines for implementing network function virtualization (NFV), wherein a virtual machine from the plurality of virtual machines is configured to execute a method for managing fragmentation of packets for content object retrieval. The computing device includes a non-transitory machine readable medium having stored therein a content acquisition module and a processor coupled to the non-transitory machine readable medium. The processor is configured to execute the virtual machine. The virtual machine is configured to execute the content acquisition module. The content acquisition module is configured to receive a first CCN interest packet including a name for a first content object from a user equipment in an access network, to store a fragmentation stream identifier in a header of the first CCN interest packet, to set a path MTU in the first CCN interest packet to an MTU value required by a link between the CCN gateway and a node forwarding the first CCN interest packet to the CCN gateway, to forward the first CCN interest packet with updated fragmentation stream identifier and path minimum MTU toward a content provider, to receive a set of packets of including fragments of the first content object from the content provider, to reassemble and verify the first content object from the set of packets, to refragment the first content object to minimum MTU of the access network and store the refragmented first content object in the content store, and to return the first content object to the user equipment in the access network.

A control plane device to implement at least one centralized control plane for a software defined network (SDN), the centralized control plane configured to execute a method for managing fragmentation of packets for content object retrieval. The computing device includes a non-transitory machine readable medium having stored therein a content acquisition module, and a processor coupled to the non-transitory machine readable medium. The processor is configured to execute the content acquisition module. The content acquisition module is configured to receive a first CCN interest packet including a name for a first content object from a user equipment in an access network, to store a fragmentation stream identifier in a header of the first CCN interest packet, to set a path minimum maximum transmission unit (MTU) in the first CCN interest packet to an MTU value required by a link between the CCN gateway and a node forwarding the first CCN interest packet to the CCN gateway, to forward the first CCN interest packet with updated fragmentation stream identifier and path minimum MTU toward a content provider, to receive a set of packets of including fragments of the first content object from the content provider, to reassemble and verify the first content object from the set of packets, to refragment the first content object to minimum MTU of the access network and store the refragmented first content object in the content store, and to return the first content object to the user equipment in the access network.

BRIEF DESCRIPTION OF THE DRAWINGS

The invention may best be understood by referring to the following description and accompanying drawings that are used to illustrate embodiments of the invention. In the drawings:

FIG. 6C illustrates various exemplary ways in which virtual network elements (VNEs) may be coupled according to some embodiments of the invention.

FIG. 6D illustrates a network with a single network element (NE) on each of the NDs of FIG. 6A.

FIG. 6E illustrates an example where each of the NDs implements a single NE (see FIG. 6D), but the centralized control plane has abstracted multiple of the NEs in different NDs into a single NE in one of the virtual network(s) of FIG. 6D, according to some embodiments of the invention.

FIG. 6F illustrates a case where multiple VNEs are implemented on different NDs and are coupled to each other, and where the centralized control plane has abstracted these multiple VNEs such that they appear as a single VNE within one of the virtual networks of FIG. 6, according to some embodiments of the invention.

DETAILED DESCRIPTION

Figure 1:
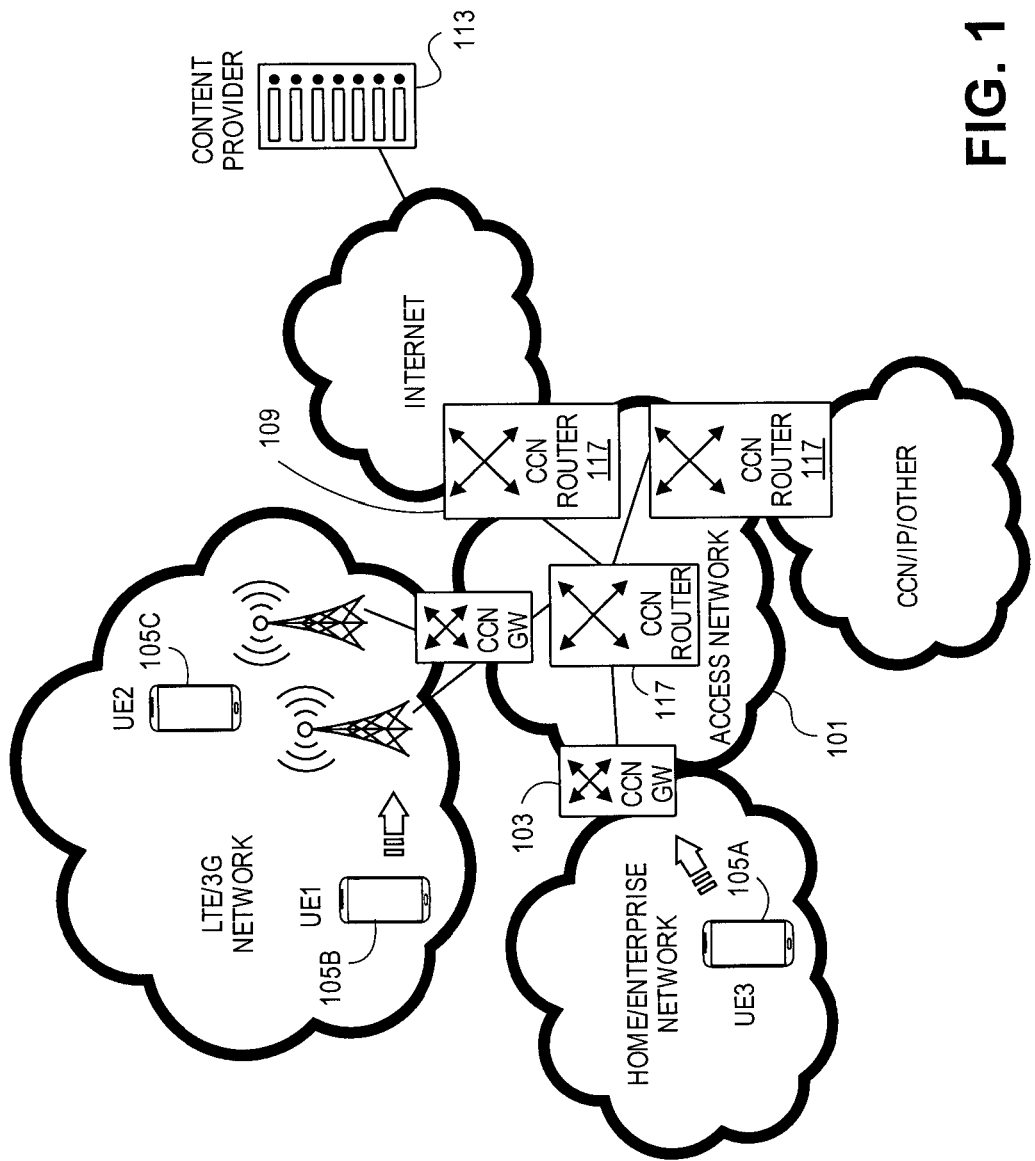
FIG. 1 is a diagram of one embodiment of a CCN network including placement of CCN gateways, CCN routers and content providers in the CCN network.

The following description describes methods and apparatus for managing content object fragmentation at a CCN gateway. The methods and apparatus implements the CCN gateway as a CCN fragmentation gateway that is situated between the information centric network (ICN) and an external network. The CCN fragmentation gateway manages each network as separate 'fragmentation domains.' The CCN fragmentation gateway retrieves content objects requested by user equipment of the external network and manages the returned content object to server content object requests from the external network without requiring further communication outside the external network. The CCN fragmentation gateway stores a local copy of each retrieved content object and organizes the fragments of the received content object of efficient retransmission to requesting user equipment on respective external networks.

References in the specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Fragmentation in Internet Protocol Networks

Fragmentation is a distribution of a discrete payload of an Internet Protocol packet over multiple packets. The fragmentation of data over multiple packets is a process that has been developed to improve proper transmission of content over different network layers and protocols to solve a problem raised by the diversity of the protocols use in the Internet. Different technologies (i.e., protocols and mediums) have used different maximum transmission units (MTUs). An MTU is a maximum payload size for a message for a given protocol or medium. To prevent having to regroup data repeatedly from an IP packet payload, the MTU can be used to limit the payload of the IP packet forcing the fragmentation of the data across multiple IP packets. IP packets can have payloads of any size, however, IP packets having payloads of a bigger size than the MTU for a link or network need to be handled by splitting the packet into two or more IP packets that will be joined at the other end of the communication to retrieve the original payload of an IP packet.

This packet fragmentation mechanism, although necessary to have a usable Internet, solves the problem of sending the data across such varied combination of network protocols and mediums, but creates new problems. For example, in real time communications the fragmentation can create additional delay and jitter which diminishes the quality of the communication. The fragmentation also reduces the efficiency of the links as each fragmented packet needs to be built with all the protocol headers required in the network configuration. In addition, fragmentation also adds new computational requirements on the receivers of the packets as they require extra buffer storage space to store the fragments and computing power to defragment them.

Information Centric Networks

FIG. 1 is a diagram of one example of an example architecture of a content centric network (CCN) network. The CCN network in this example is an access network 101. The access network 101 is in communication with a set of separately administered networks including a home/enterprise network, the Internet and an LTE/3G mobile network. The example shows that the access network can be further in communication with any number of additional CCN networks, IP networks or other types of networks. In this example, the access network implements the fragmentation system and processes described further herein below and is provided by way of example and not limitation. A CCN network can be utilized in other contexts such as home networks, enterprise networks, or similar independently administered public or private networks.

The access network can have any number of nodes and can utilize any combination of layer 1 and layer 2 protocols for communication between the CCN nodes of the access network 101. For sake of clarity, the nodes implementing the fragmentation management system are shown and described. The CCN nodes are network devices (ND), as discussed further herein below. The CCN nodes include a set of CCN routers 117 and CCN gateways (GW) 103. The CCN routers 117 manages CCN interest packets, forwarding these packets toward the corresponding content provider 113 and managing the content response messages by forwarding them toward the requesting user equipment 105A-C.

The CCN nodes that communicate with the user equipment 105A-C in the separately administered networks are the CCN gateways 103. The user equipment 105A-C can be any type of user device including mobile devices, laptop computers, desktop computers, console devices, workstations and similar computing devices. The CCN gateways 103 identify users of the user equipment 105A-C and apply the fragmentation management processes for efficient retrieval and return of content objects between the user equipment 105A-C content providers 113. The process for fragmentation management implemented by the CCN gateways 103 is discussed further herein below.

The content provider 113 can be any computing device in communication with the access network 101. The access network 101 can be in communication with any number and variety of content providers 113. The content provider 113 can be a server or similar computing device that hosts a set of services and resources such as data stores including web pages, audio/visual content, documents and similar static and/or dynamically generated data.

Figure 2:
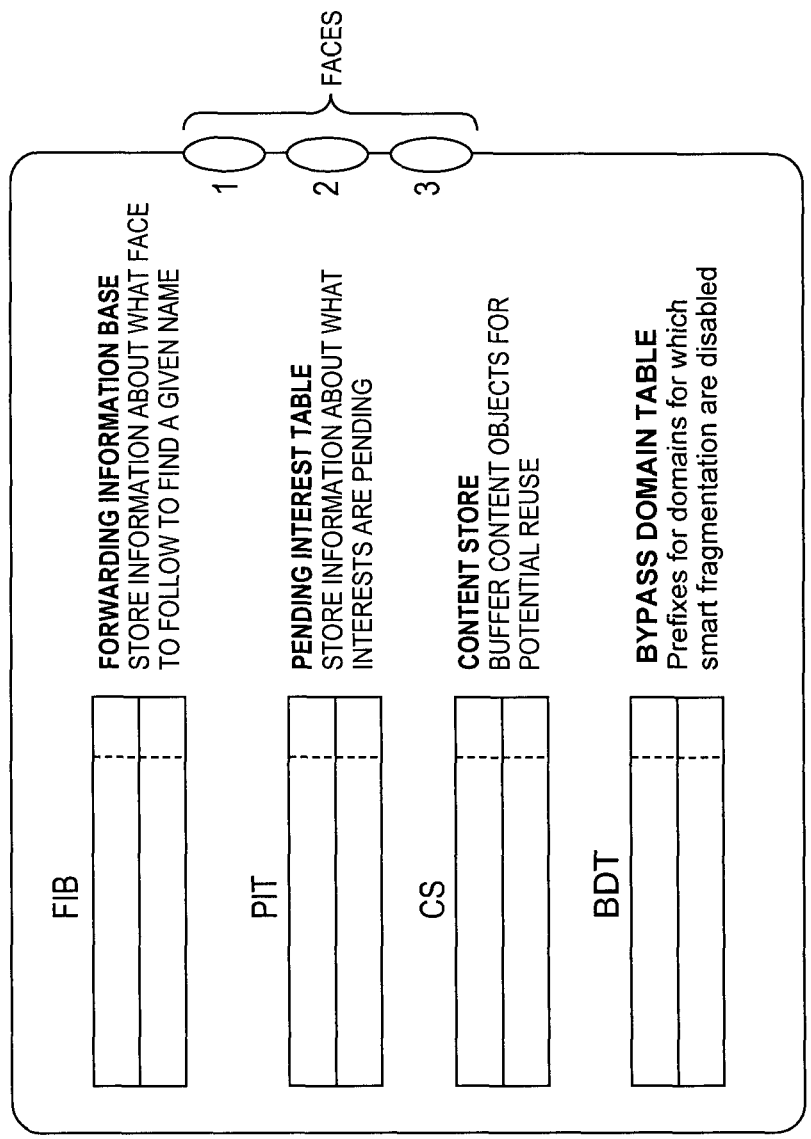
FIG. 2 is a diagram of one embodiment of an example set of data structures maintained by a CCN gateway node.

FIG. 2 is a diagram of one embodiment of the set of data structures maintained by CCN nodes. The CCN nodes such as CCN routers and CCN gateways maintain three or four sets of tables for tracking information related to CCN. In prior systems, only three tables were typically maintained. The existing CCN tables include the forwarding information base (FIB), the pending interest table (PIT) and the content store (CS). In some embodiments, a fourth table can be maintained in the form of a bypass domain table (BDT). The FIB is equivalent to the routing table in IP, where destination addresses and networks for particular content objects identified by CCN names are matched with an output interface. In CCN, the IP prefixes utilized for matching on the routing table are replaced with content name prefixes of the CCN names.

The PIT stores the CCN interest packets that have been received, but that have not been responded to yet. The entries of these CCN interest packets are referred to as 'pending interests' and are removed from the PIT when a corresponding content object is sent toward the originating user equipment that generated the CCN interest packet via the associated ingress port or when the pending interest times out. In one embodiment, the PIT is expanded to store a fragmentation stream identifier (i.e., a FramentStreamID) for each CCN interest packet received by the CCN gateway to enable tracking of received fragments on a stream by stream basis and to enable the defragmentation and differentiation of the various streams independently.

The CS is an optional local cache of content objects. This cache is optional and can have any size or store any number of content objects. CCN nodes can choose not to cache anything (for example in a core network where cache size would need to be huge in order to maximize cache hits). In one embodiment, the CS stores a set of recently received content objects.

In one embodiment, a BDT table is maintained that includes an entry for each known prefix identifying a domain, range or set of content objects for which the fragmentation management process are not applied. Each entry in the BDT table can correspond to a separate prefix, content object name, or similar identifier local or global identifier. The BDT table can be populated by external configuration of the CCN gateway by a controller, administrator or other external entity via any interface or configuration protocol.

Each CCN node also provides a set of network interfaces also referred to as "faces" over which CCN interest packets are received and forwarded and similarly over which CCN response packets are received and forwarded. In the example illustration the CCN node includes three network interfaces, which are faces 1, 2, and 3. These network interfaces can represent a physical link or a Layer 2 interface The network interfaces can also represent, in some embodiments, a transport protocol such as TCP/IP (in overlay mode) or even an application.

The basic data traffic forwarding in CCN is typically performed as explained below with an example sequence:

1. A CCN interest packet arrives through a face (network interface).
2. The CCN node checks whether it has the requested content object stored in its CS.
3. If the content object is found then go to step 7
4. If the content object is not found in the CS, then a check is made whether the same content has already been requested, by looking for a matching CCN name in the PIT.
5. If is a matching PIT entry is found, then update it by adding the network interface through which the CCN interest was received to the PIT entry. In this case, the process then exits.
6. If no matching PIT entry is found, then a new entry is created for the CCN name, and the CCN interest is forwarded toward the content provider according to CCN name prefix matching using the FIB.
7. When a content object arrives through a network interface in a CCN response packet, then forward the CCN response packet to each of the network interfaces listed in the related PIT entry. If the content object was found in the content store, then forward it to the network interface over which the corresponding CCN interest packet was received.

In the CCN networks of the prior art, the CCN networks are structured such that a single CCN node that can be referred to as a packet gateway performs the role of gateway to the CCN network, such as an access or operator network. In these architectures all the data traffic will go through this packet gateway. For instance, in mobile networks, as mentioned above, there is always a serving gateway and PDN gateway (also known as EPG, Evolved Packet Gateway) that are the only entry/exit points of the access network to other networks such as the Internet. This creates a single point for various types of policy enforcement, but at the same time this is a bottleneck for the network Fragmentation in CCN Fragmentation in a CCN network takes place between an ingress point and an egress point for the CCN network and is referred to as an end-to-end fragmentation. The end-to-end fragmentation in CCN aims to find the minimum maximum transmission unit (MTU) to send the traffic over the network. Caching capabilities of intermediate nodes in the CCN network remain the same, so fragments can be stored in the cache but in order for this to function correctly, the intermediate nodes must assembled and verify each complete content object.

In an a type length value (TLV) of a CCN interest packet, the end-to-end fragmentation process adds a step to compute the minimum MTU on a per hop basis where each hop updates a new field called the PathMinimumMTU value. Another new field, the FragmentStreamID, is a random number that identifies a continuous stream of fragments.'

In the fragmentation system and processes, the content object is updated to include a similar fragmentation TLV to that of the CCN interest packet including a fragmentation stream identifier (FragmentStreamID), where the FragmentStreamID is a hash of the content object and am InterestStreamID is the FragmentStreamID value in the CCN interest packet. The FragmentStreamID is important in this process and system, because the content object fragments are all correlated to the content object itself using this identifier and all the transmitted fragments for a particular content object will have the same FragmentStreamID.

However, the embodiments of the prior art have a number of disadvantages. The fragmentation in IP networks was built to solve a problem caused by different technologies (e.g., network protocols and mediums) coexisting in the Internet. The prior art solution was to split a packet into two or more whenever it could not be delivered in one packet. This works, although it creates a number of problems including poor performance in real time applications, extra computational requirements in nodes that need to perform the fragmentation and in the receiver that has to defragment the packets. In addition, fragmentation creates security holes. With IPv6 the fragmentation has been removed in transit routers. The end points of a communication over IPv6 need to find the minimum MTU in the path but this is not always possible as ICMP is required to find this minimum MTU but many nodes have Internet control message protocol (ICMP) disabled for security reasons. Another prior art solution was to use the maximum segment size (MSS) of transmission control protocol (TCP), but this can't be applied to all traffic, only TCP.

With regard to the prior art of CCN fragmentation, the prior art is focused on finding the minimum MTU along the path to avoid refragmentation of any packets for the stream. This is done by adding a TLV as described herein above. The basic problem with the prior art solution for CCN is that the network traffic is not optimized for nodes to be caching a fragmented content object. The nodes in the CCN network such as CCN gateways will not reply to a newly received CCN interest with a PathMinimumMTU lower than the one used for the data stored in the cache. The prior art CCN fragmentation solution creates another problem that the same content object may be cached several times if different minimum MTU sizes are requested, because the CCN nodes can't serve the content if the minimum MTU is lower than the one used for the content object that is already stored. Thus, a new copy of the content object with a different fragmentation is delivered over the network from the content provider and is redundantly cached in any CCN nodes which the new fragmentation packets go through.

The embodiments of the invention overcome these disadvantages of the prior at. The embodiments provide a new fragmentation process and system via a CCN gateway that manages the fragmentation in the CCN network. This CCN gateway acts as a CCN fragmentation gateway between an access network that may be controlled by the same administrator as the CCN fragmentation gateway and other external as shown and described above in regard to FIG. 2.

The CCN fragmentation gateway handles the two networks as different "fragmentation domains." The CCN fragmentation gateway retrieves content objects requested via CCN interest packets by user equipment in the external network and then manages the content objects received to serve the CCN interest packets without the need of further communication outside the external network. As described in further detail herein below, the CCN fragmentation gateway stores a single copy of the full content object and transmits it in the most efficient way possible. By doing so, the CCN fragmentation gateway improves the caching mechanism of the CCN networks by adapting the fragment size for a requested content. This reduces the amount of traffic going across the CCN network, removes the possibility of caching duplicates of the same content object and maximizes the utilization of the network by adjusting the minimum MTU only to the requirements of the CCN network.

The embodiments provide a process and system in a CCN gateway that acts as a proxy at the edge of the CCN network to improve network performance. The embodiments avoid content data duplication in CCN routers due to different MTU sizes in different CCN interest packets, reduce traffic going out of or across the CCN network due to problems when serving it from the cached content store, and maximize the minimum MTU used in the CCN network as it is only constrained by the requirements in the CCN network and not by any other node in other networks through which the packets go to reach the content origin.

This embodiments of the invention allow optimization of data flow caching in any Information-Centric Network such as CCN. Its unique advantages include that the fragmentation management process and system manages MTU sizes inside a CCN network independent of adjacent networks. The process and system separate "fragmentation domains" in CCN networks. The process and system reuse fragmentation described in CCN networks to improve performance of the part of the network under the control of the fragmentation gateway manager. The embodiments improves the CCN caching mechanism by increasing the performance of the content download and avoiding servers not being served via the cached content objects in local content stores due to a smaller MTU fragments being stored there. The embodiments improve the CCN caching mechanism by serving content objects when the maximum MTU is smaller than the time when the content was cached (in prior art CCN fragmentation the content can't be retrieved from the cache but a new copy of the content with the new MTU needs to be sent from the content originator to the destination). The embodiments provide a better utilization of resources as the embodiments don't store duplicated information in the CCN router caches due to different fragmentation sizes.

Figure 3A:
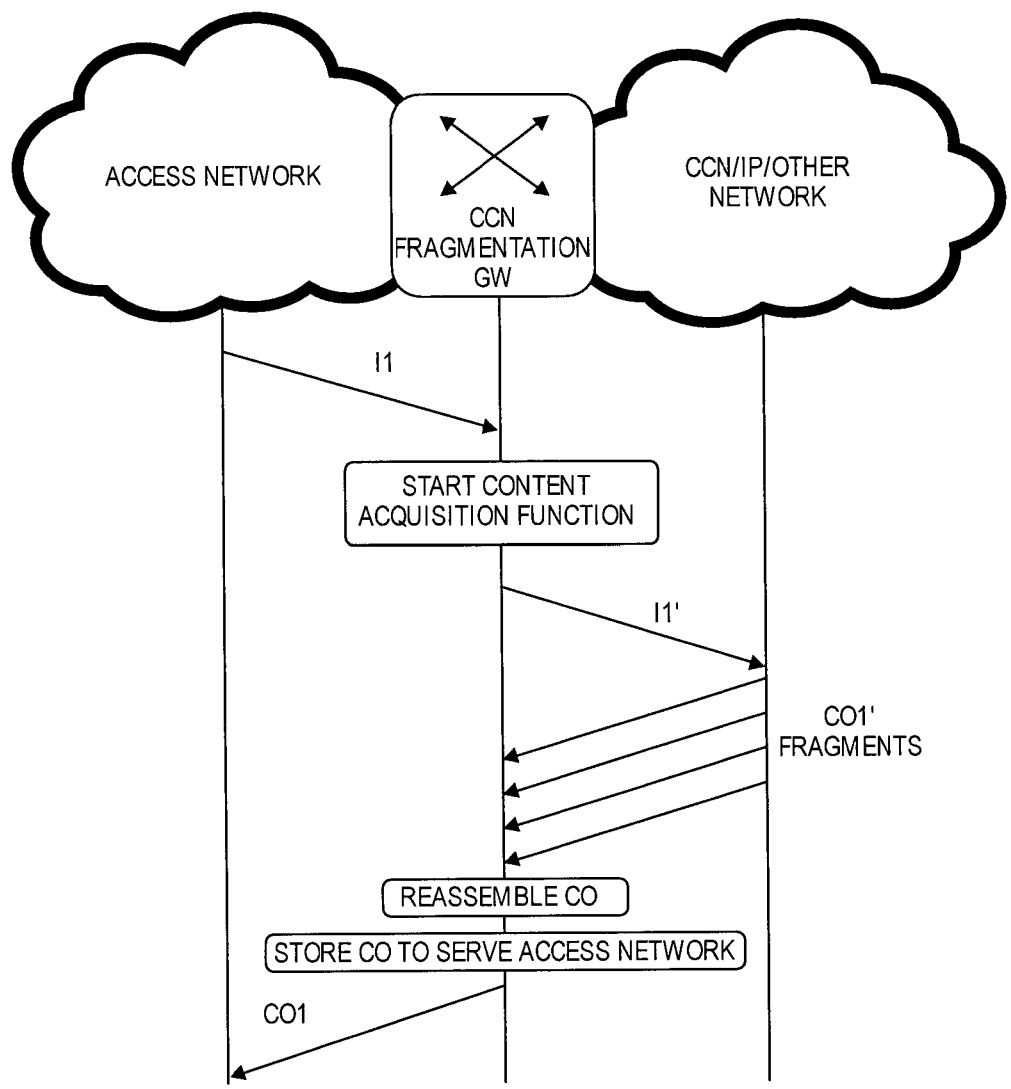
FIG. 3A is a timing diagram of one embodiment of a process for content acquisition.

FIG. 3A is a timing diagram of one embodiment of a process for content acquisition process in the CCN gateway. The diagram illustrates that the CCN gateway operating as a CCN fragmentation gateway is positioned between a CCN network, for example an access network, and an external network, such as another CCN network, an IP network or other type of network, through which a content provider is reachable. The CCN fragmentation gateway receives a CCN interest packet (I1) from a user equipment or similar origin over the CCN network. Once the CCN interest packet (I1) is received at the CCN fragmentation gateway and after there has been a cache miss in the local content store or similar location for the content object identified in the CCN interest packet, then the content acquisition module is called to retrieve the content object.

The timing diagram illustrates the flow of the content acquisition process. When interest I1 is received, the CCN fragmentation gateway stores the FragmentStreamID value received in the fragmentation header of the CCN interest packet I1. This value can be stored in an additional column in the PIT (Pending Interest Table). This value is required to answer the CCN interest packet when the content object is returned. The CCN fragmentation gateway, sets the PathMinimumMTU to the value required by the CCN fragmentation gateway based on the link between the CCN fragmentation gateway and the next hop node in the adjoining network in the path to the content provider.

After these values are set in the CCN interest packet, then the updated CCN interest packet ('I1) is forwarded. Ultimately this CCN interest packet is received at the content provider, which responds to the CCN interest packet by sending a content object in a CCN response packet that is fragmented across multiple packets. The reception of the fragments of the content object (CO1') causes the fragments to be stored in a temporal cache such as a local content store or similar location. When the last fragment of a content object is received, the original content object is assembled and verified.

Upon correct assembling and verification, the content object is now prepared to be refragmented to optimize content object for transmission across the CCN network, in this example an access network. The content object is refragmented to the minimum MTU of the access network so that the content can be cached in other CCN nodes in the access network and there will never be cache misses due to new request with PathMinimumMTU lower that the one use the first time. Finally the fragments of the content object are sent via the face through which the CCN interest packet I1 was received and using the FragmentStreamID stored in the PIT for each face through which the I1 was received.

In some cases, other CCN interest packets for same content object may be received at the CCN fragmentation gateway. In this case, the minimum PathMinimumMTU should be stored for the CCN interest packet and once the content object is reassembled and verified by the CCN fragmentation gateway, all the CCN interest packets can be satisfied as described in herein above.

Figure 3B:
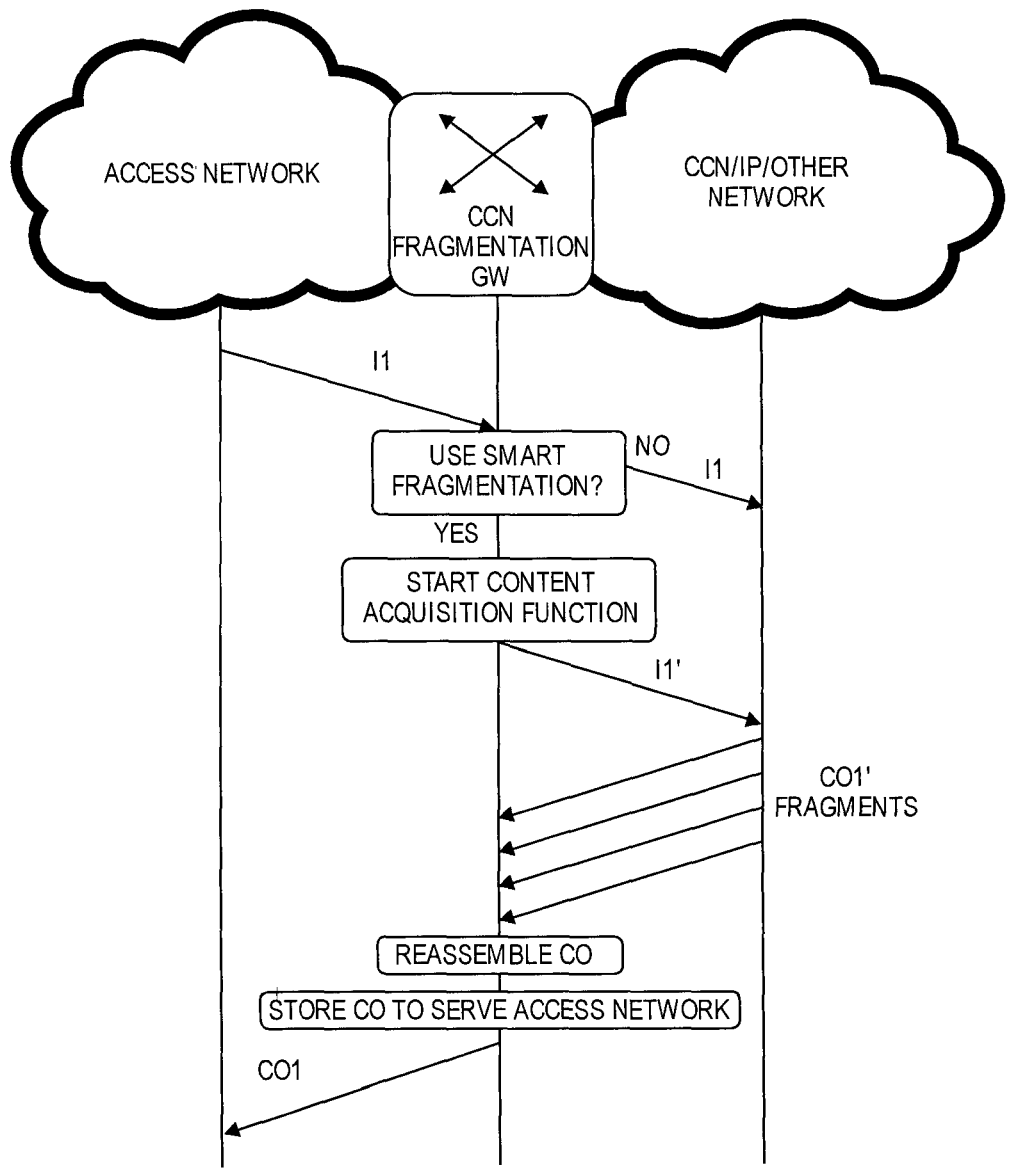
FIG. 3B is a timing diagram of one embodiment of a process for smart fragmentation.

FIG. 3B is a timing diagram of one embodiment of a process for smart fragmentation process in the CCN gateway. Some applications communicating over a network and playing a role in requesting content objects are very sensitive to delay such that the embodiments described herein for content acquisition and fragmentation management may not be applicable or serviceable. To solve this problem, the smart fragmentation module can be implemented at a CCN gateway implementing a CCN fragmentation gateway to check if it is needed to bypass the content Acquisition process. Through configuration or as input from another node, the information of the CCN name prefixes or domains that will bypass this functionality can be defined. A new table in the CCN architecture is required to store these name prefixes, this additional table or data structure is referred to herein as a bypassed domains table (BDT).

The smart fragmentation process performs a check to determine whether content acquisition is to be performed using the fragmentation process described herein, in the illustration this is shown as the query "use smart fragmentation?" If the embodiments of the fragmentation and content acquisition process are not to be utilized, then the received CCN interest packet I1 is forwarded toward the content provider. In some embodiments, this check is performed after checking whether the content is in the cache.

Thus, the process begins when the CCN interest packet I1 is received in the CCN fragmentation gateway. After checking that the content object requested in the CCN interest packet I1 is not in the local content store or similar cache, the check is made for whether the fragmentation process described herein and content acquisition process are to be performed. A check can be made whether the content name requested in I1 has any of the prefixes stored in the bypassed domains table (BDT). If a prefix is found in the table, then the CCN interest packet I1 is forwarded towards the face of the CCN network, IP network or similar external network through which the content provider is reachable and the process follows the normal CCN flow when the content object is received, no matter if it comes in one packet or in several fragments. If a match is not found in the BDT, the content acquisition process discussed herein above is performed.

Figure 4:
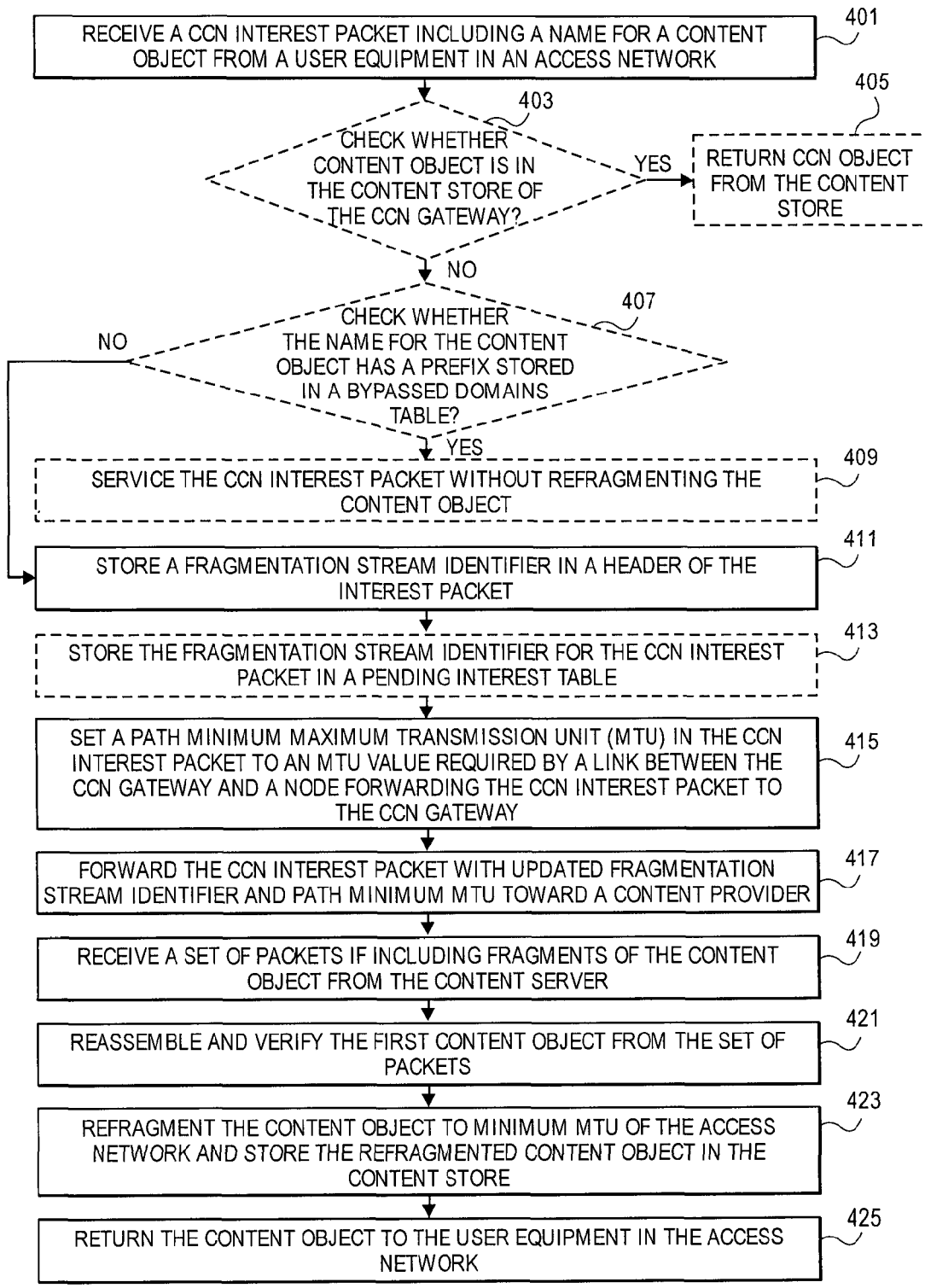
FIG. 4 is a flowchart of one embodiment of a process for managing fragmentation of a content object at a CCN gateway.

FIG. 4 is a flowchart of one embodiment of the fragmentation management process encompassing content acquisition and smart fragmentation. The fragmentation process is implemented by the CCN gateway functioning as a CCN fragmentation gateway. The process executed by CCN gateway is initiated in response to receiving a CCN interest packet over a network interface of the CCN gateway (Block 401). The CCN interest packet specifies a content object using a CCN name such as a uniform resource locator or similar format of name that is unique local to the CCN network or a content provider. The CCN interest packet can also identify a content provider separately or as part of the name for the content object. Thus, the CCN gateway may inspect the CCN interest packet to determine what the name of the requested content object is and to determine how to forward the CCN interest packet toward a content provider.

In some embodiments, a check is made whether the requested content object is already stored in the local content store (Block 403). If already stored, then the process can return the stored CCN object from the content store (Block 405).

The smart fragmentation check can then be performed using the CCN name (Block 403). The check looks up the name and subsets of the name, such as a prefix or domain associated with or part of the CCN name, in the BDT (Block 407). If a match is found in the BDT, then the fragmentation process is skipped by forwarding the CCN interest packet toward the content provider and processing it in a standard method either without fragmentation or using prior art fragmentation, in either case there is no refragmentation (Block 409). This avoids the extra processing and delays that the embodiments of the invention may incur and affect performance for certain designation applications.

If the fragmentation process is not being bypassed, then the fragmentation stream identifier (FragmentationStreamID) can be generated and inserted into the header of the CCN interest packet or if already present it can be retrieved (Block 411) from the received CCN interest packet and stored locally in the PIT or similar location for use in defragmenting (Block 413). The received CCN interest packet is updated by setting the path minimum MTU to be the an MTU value required by a link between the CCN gateway and a node (e.g., a next hop) forwarding the CCN interest packet toward the content provider or the node that forwarded the CCN interest packet to the CCN gateway (Block 415). The path minimum MTU is updated when this adjacent link MTU is lower than the value currently in the path minimum MTU of the CCN interest packet. After this field has been updated, then the CCN interest packet can be forwarded toward the content provider (Block 417). The content provider services the CCN interest packet and will return the requested content object.

The content object can be received in a set of CCN response messages (Block 419). Thus, the content object can be received as a set of fragments. After all of the fragments have been received and organized according to their fragment stream identifier, then the content object can be defragmented (Block 421). The fragment stream identifier can be generated as a hash of a content object, CCN name, or similarly identify a content object request. The base fragment stream identifier can be used as a starting point of a sequence identifying each of the fragments. Any similar sequencing process can be utilized to identify each of the fragments and their order.

Once defragmented, the content object can be refragmented to be stored in the local content store (Block 423). The refragmented content object can be refragmented to any standardized MTU. The fragments of the content object can have a minimum MTU for the CCN network or be similarly sized to ensure proper transmission with minimum processing and overhead within the CCN network. The refragmented content object can then be sent toward the requesting user equipment via the content network, for example an access network.

Architecture

Figure 5:
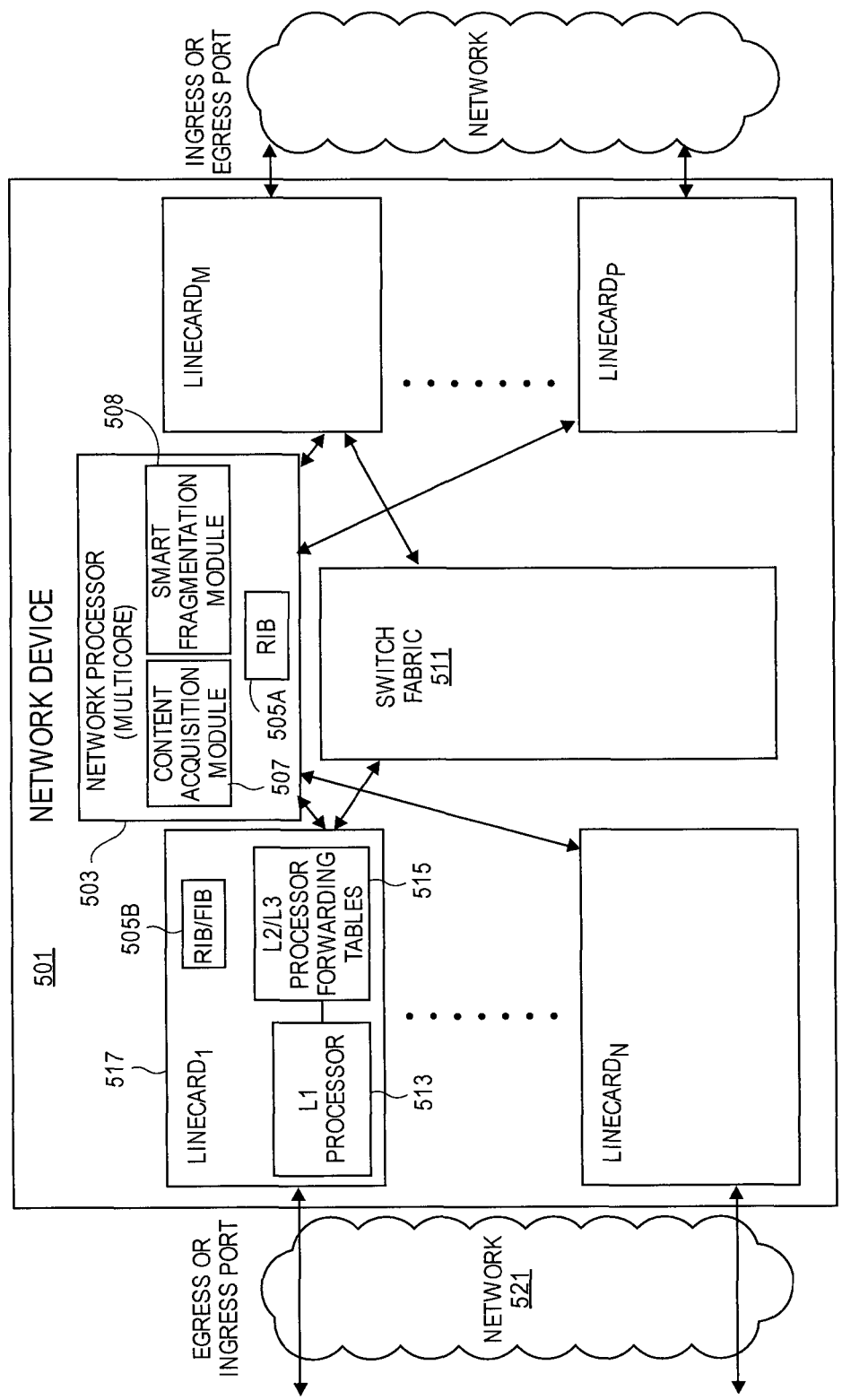
FIG. 5 is a diagram of one embodiment of a network device (ND) implementing a process for managing fragmentation of a content object.

FIG. 5 is a diagram of one embodiment of a network device implementing the fragmentation process and system. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a network device 501 or similar computing device. The network device 501 can have any structure that enables it to receive data traffic and forward it toward its destination. The network device 501 can include a network processor 503 or set of network processors that execute the functions of the network device 501. A 'set,' as used herein, is any positive whole number of items including one item. The network device 501 can execute a content acquisition module 507 to implement the functions of managing the fragmenting of a content object where the network device 501 functions as a CCN gateway as described herein above via a network processor 503 and can implement a smart fragmentation module 508 to implement a process for determining whether a CCN interest packet should be processed using the above referenced fragmentation module 508. The network device 501 connect with separately administered networks that have user equipment and/or content providers. The network processor 503 can implement the content acquisition module 507 and/or the smart fragmentation module 508 as a discrete hardware, software module or any combination thereof. The network processor 503 can also service the routing information base 505A and similar functions related to data traffic forwarding and network topology maintenance. The routing information base 505A can be implemented as match action tables that are utilized for forwarding protocol data units PDUs (i.e. packets). The functions of the content acquisition module 507 and smart fragmentation module 508 can be implemented as modules in any combination of software, including firmware, and hardware within the network device. The functions of the content acquisition module 507 and smart fragmentation module 508 that are executed and implemented by the network device 501 include those described further herein above.

In one embodiment, the network device 501 can include a set of line cards 517 that process and forward the incoming data traffic toward the respective destination nodes by identifying the destination and forwarding the data traffic to the appropriate line card 517 having an egress port that leads to or toward the destination via a next hop. These line cards 517 can also implement the forwarding information base 505B, or a relevant subset thereof. The line cards 517 can also implement or facilitate the content acquisition module 507 and smart fragmentation module 508 functions described herein above. The line cards 517 are in communication with one another via a switch fabric 511 and communicate with other nodes over attached networks 521 using Ethernet, fiber optic or similar communication links and media.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different from those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the network device 501 may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices. One or more parts of an embodiment of the invention may be implemented using different combinations of software, firmware, and/or hardware.

Figures 6A, 6B:
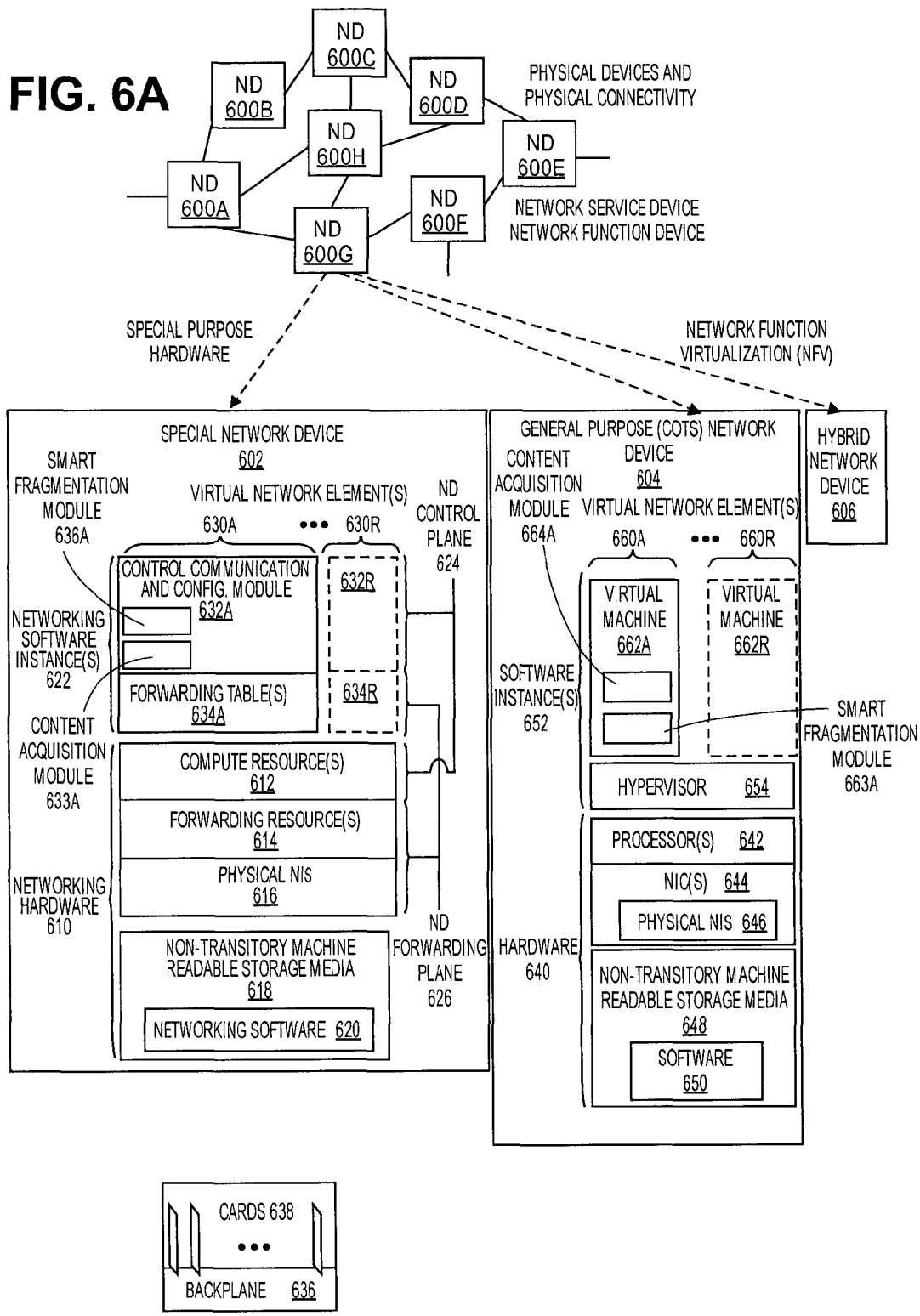
FIG. 6A illustrates connectivity between network devices (NDs) within an exemplary network, as well as three exemplary implementations of the NDs, according to some embodiments of the invention.
FIG. 6B illustrates an exemplary way to implement the special-purpose network device according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). In some embodiments, the control communication and configuration module 632A encompasses the content acquisition module 633A and smart fragmentation module 636A as described herein above.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) (i.e. implemented as match action tables) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) are to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 816 based on the forwarding table(s) 634A-R.

FIG. 6B illustrates an exemplary way to implement the special-purpose network device 602 according to some embodiments of the invention. FIG. 6B shows a special-purpose network device including cards 838 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate a hypervisor 654 (sometimes referred to as a virtual machine monitor (VMM)) and one or more virtual machines 662A-R that are run by the hypervisor 654, which are collectively referred to as software instance(s) 652. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 662A-R, and that part of the hardware 640 that executes that virtual machine (be it hardware dedicated to that virtual machine and/or time slices of hardware temporally shared by that virtual machine with others of the virtual machine(s) 662A-R), forms a separate virtual network element(s) 660A-R. In some embodiments, the virtual machine module 662A encompasses content acquisition module 663A and smart fragmentation module 664A.

The virtual network element(s) 660A-R perform similar functionality to the virtual network element(s) 630A-R. For instance, the hypervisor 654 may present a virtual operating platform that appears like networking hardware 610 to virtual machine 662A, and the virtual machine 662A may be used to implement functionality similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premises equipment (CPE). However, different embodiments of the invention may implement one or more of the virtual machine(s) 662A-R differently. For example, while embodiments of the invention are illustrated with each virtual machine 662A-R corresponding to one VNE 660A-R, alternative embodiments may implement this correspondence at a finer level of granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 654 includes a virtual switch that provides similar forwarding services as a physical Ethernet switch. Specifically, this virtual switch forwards traffic between virtual machines and the NIC(s) 644, as well as optionally between the virtual machines 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the virtual machines 662A-R may operate as servers; the same would be true for the hybrid network device 606; in the case of the special-purpose network device 602, one or more such servers could also be run on a hypervisor executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R that are implementations of match action tables (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach). In some embodiments, the centralized reachability and forwarding module 679 encompasses fragmentation functions in corresponding content acquisition module 681 as described herein above as well as the functions in corresponding smart fragmentation module 682 as described herein above.

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments of the invention. FIG. 6E shows that in this virtual network, the NE 670I is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
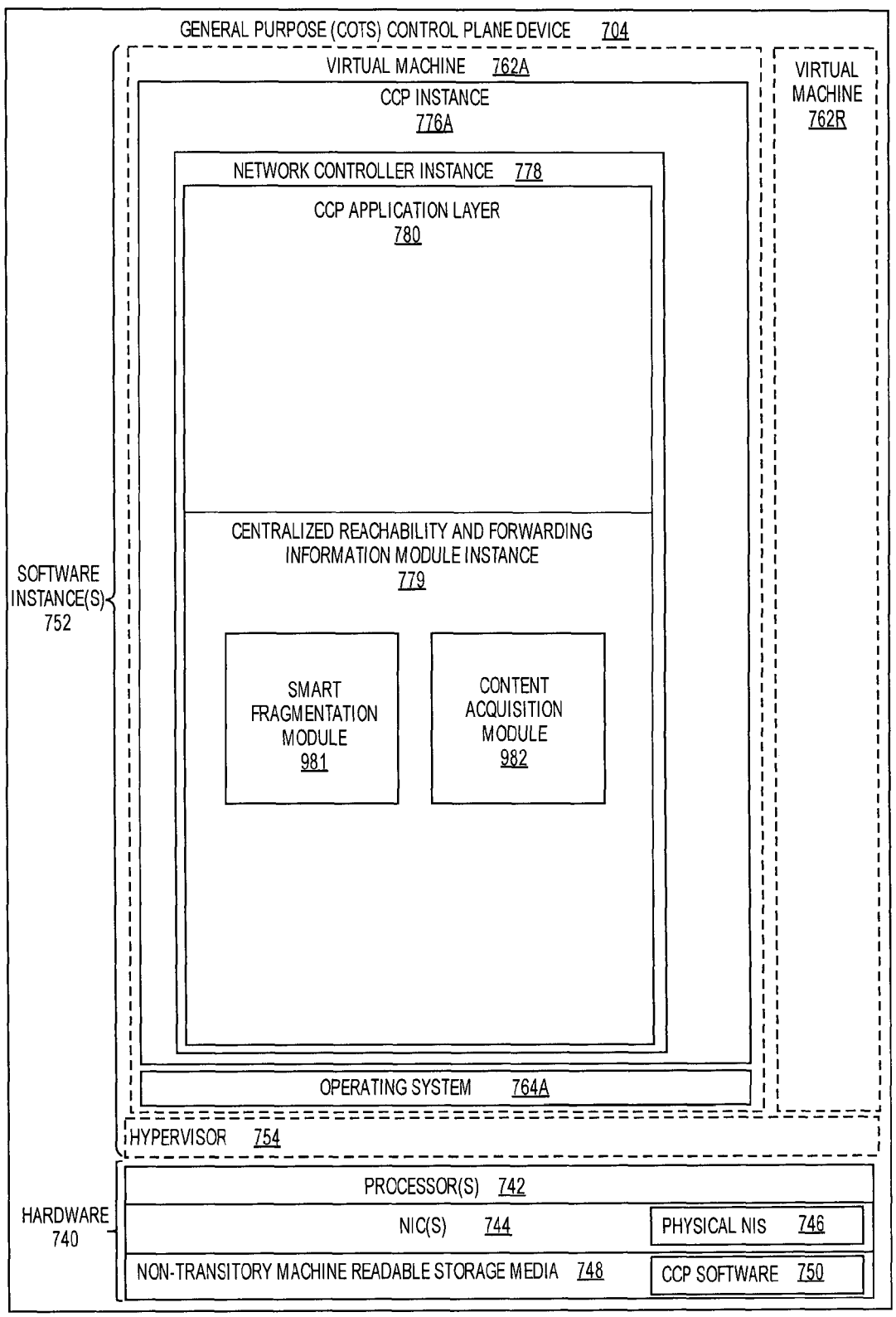
FIG. 7 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750.

In embodiments that use compute virtualization, the processor(s) 742 typically execute software to instantiate a hypervisor 754 (sometimes referred to as a virtual machine monitor (VMM)) and one or more virtual machines 762A-R that are run by the hypervisor 754; which are collectively referred to as software instance(s) 752. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 750 (illustrated as CCP instance 776A) on top of an operating system 764A are typically executed within the virtual machine 762A. In embodiments where compute virtualization is not used, the CCP instance 776A on top of operating system 764A is executed on the "bare metal" general purpose control plane device 704.

The operating system 764A provides basic processing, input/output (I/O), and networking capabilities. In some embodiments, the CCP instance 776A includes a network controller instance 778. The network controller instance 778 includes a centralized reachability and forwarding information module instance 779 (which is a middleware layer providing the context of the network controller 778 to the operating system 764A and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 776 works with virtual network view(s) (logical view(s) of the network) and the middleware layer provides the conversion from the virtual networks to the physical view. The CCP application can encompass the functionality of content acquisition module 781 and the smart fragmentation module 782 as described herein above.

The centralized control plane 776 transmits relevant messages to the data plane 780 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for managing fragmentation of packets for content object retrieval at a content centric networking (CCN) gateway in a CCN network, the method comprising the steps of:
    receiving a first CCN interest packet including a name for a first content object from a user equipment in an access network;
    storing a fragmentation stream identifier in a header of the first CCN interest packet;
    setting a path minimum maximum transmission unit (MTU) in the first CCN interest packet to an MTU value required by a link between the CCN gateway and a node forwarding the first CCN interest packet to the CCN gateway;
    forwarding the first CCN interest packet with updated fragmentation stream identifier and path minimum MTU toward a content provider;
    receiving a set of packets, including fragments of the first content object from the content provider;
    reassembling and verifying the first content object from the set of packets;
    refragmenting the first content object to minimum MTU of the access network and storing the refragmented first content object in a content store; and
    returning the first content object to the user equipment in the access network.

2. The method of claim 1, further comprising the step of:
    receiving a second CCN interest packet including a name for a second content object;
    checking whether the second content object is in the content store of the CCN gateway;
    in response to the second content object not being found in the content store, checking whether the name for the second content object has a prefix stored in a bypassed domains table; and
    in response to the prefix being found in the bypassed domains table, servicing the second CCN interest packet without refragmenting the second content object.

3. The method of claim 1, further comprising:
    storing the fragmentation stream identifier for the first CCN interest packet in a pending interest table.

4. The method of claim 1, further comprising the step of:
    receiving a third CCN interest packet for the first content object with a different path minimum MTU than the first CCN interest packet; and
    servicing the third CCN interest packet using the first content object refragmented in the content store.

5. A network device implementing content centric networking (CCN) gateway to execute a method for managing fragmentation of packets for content object retrieval, the network device comprising:
    a non-transitory machine readable medium having stored therein a content acquisition module; and
    a network processor coupled to the non-transitory machine readable medium, the network processor configured to execute the content acquisition module, the content acquisition module configured to receive a first CCN interest packet including a name for a first content object from a user equipment in an access network, to store a fragmentation stream identifier in a header of the first CCN interest packet, to set a path minimum maximum transmission unit (MTU) in the first CCN interest packet to an MTU value required by a link between the CCN gateway and a node forwarding the first CCN interest packet to the CCN gateway, to forward the first CCN interest packet with updated fragmentation stream identifier and path minimum MTU toward a content provider, to receive a set of packets, including fragments of the first content object from the content provider, to reassemble and verify the first content object from the set of packets, to refragment the first content object to minimum MTU of the access network and store the refragmented first content object in a content store, and to return the first content object to the user equipment in the access network.

6. The network device of claim 5, wherein the non-transitory machine readable medium further stores a smart fragmentation module, and the network processor is further configured to execute the smart fragmentation module, the smart fragmentation module configured to receive a second CCN interest packet including a name for a second content object, to check whether the second content object is in the content store of the CCN gateway, in response to the second content object not being found in the content store, to check whether the name for the second content object has a prefix stored in a bypassed domains table, and in response to the prefix being found in the bypassed domains table, to service the second CCN interest packet without refragmenting the second content object.

7. The network device of claim 5, wherein the content acquisition module is further configured to store the fragmentation stream identifier for the first CCN interest packet in a pending interest table.

8. The network device of claim 5, the content acquisition module to receive a third CCN interest packet for the first content object with a different path minimum MTU than the first CCN interest packet, and servicing the third CCN interest packet using the first content object refragmented in the content store.

9. A computing device implementing a plurality of virtual machines for implementing network function virtualization (NFV), wherein a virtual machine from the plurality of virtual machines is configured to execute a method for managing fragmentation of packets for content object retrieval, the computing device comprising:
   a non-transitory machine readable medium having stored therein a content acquisition module; and
   a processor coupled to the non-transitory machine readable medium, the processor configured to execute the virtual machine, the virtual machine configured to execute the content acquisition module, the content acquisition module configured to receive a first CCN interest packet including a name for a first content object from a user equipment in an access network, to store a fragmentation stream identifier in a header of the first CCN interest packet, to set a path minimum maximum transmission unit (MTU) in the first CCN interest packet to an MTU value required by a link between the CCN gateway and a node forwarding the first CCN interest packet to the CCN gateway, to forward the first CCN interest packet with updated fragmentation stream identifier and path minimum MTU toward a content provider, to receive a set of packets, including fragments of the first content object from the content provider, to reassemble and verify the first content object from the set of packets, to refragment the first content object to minimum MTU of the access network and store the refragmented first content object in a content store, and to return the first content object to the user equipment in the access network.

10. The computing device of claim 9, wherein the non-transitory machine readable medium further stores a smart fragmentation module, and the network processor is further configured to execute the smart fragmentation module, the smart fragmentation module configured to receive a second CCN interest packet including a name for a second content object, to check whether the second content object is in the content store of the CCN gateway, in response to the second content object not being found in the content store, to check whether the name for the second content object has a prefix stored in a bypassed domains table, and in response to the prefix being found in the bypassed domains table, to service the second CCN interest packet without refragmenting the second content object.

11. The computing device of claim 9, wherein the content acquisition module is further configured to store the fragmentation stream identifier for the first CCN interest packet in a pending interest table.

12. The computing device of claim 9, wherein the content acquisition module to receive a third CCN interest packet for the first content object with a different path minimum MTU than the first CCN interest packet, and servicing the third CCN interest packet using the first content object refragmented in the content store.

13. A control plane device to implement at least one centralized control plane for a software defined network (SDN), the centralized control plane configured to execute a method for managing fragmentation of packets for content object retrieval, the control plane device comprising:
   a non-transitory machine readable medium having stored therein a content acquisition module; and
   a processor coupled to the non-transitory machine readable medium, the processor configured to execute the content acquisition module, the content acquisition module configured to receive a first CCN interest packet including a name for a first content object from a user equipment in an access network, to store a fragmentation stream identifier in a header of the first CCN interest packet, to set a path minimum maximum transmission unit (MTU) in the first CCN interest packet to an MTU value required by a link between the CCN gateway and a node forwarding the first CCN interest packet to the CCN gateway, to forward the first CCN interest packet with updated fragmentation stream identifier and path minimum MTU toward a content provider, to receive a set of packets, including fragments of the first content object from the content provider, to reassemble and verify the first content object from the set of packets, to refragment the first content object to minimum MTU of the access network and store the refragmented first content object in a content store, and to return the first content object to the user equipment in the access network.

14. The control plane device of claim 13, wherein the non-transitory machine readable medium further stores a smart fragmentation module, and the network processor is further configured to execute the smart fragmentation module, the smart fragmentation module configured to receive a second CCN interest packet including a name for a second content object, to check whether the second content object is in the content store of the CCN gateway, in response to the second content object not being found in the content store, to check whether the name for the second content object has a prefix stored in a bypassed domains table, and in response to the prefix being found in the bypassed domains table, to service the second CCN interest packet without refragmenting the second content object.

15. The control plane device of claim 13, wherein the content acquisition module is further configured to store the fragmentation stream identifier for the first CCN interest packet in a pending interest table.

16. The control plane device of claim 13, wherein the content acquisition module to receive a third CCN interest packet for the first content object with a different path minimum MTU than the first CCN interest packet, and servicing the third CCN interest packet using the first content object refragmented in the content store.

* * * * *